(12) United States Patent
Heo et al.

(10) Patent No.: US 8,950,543 B2
(45) Date of Patent: Feb. 10, 2015

(54) ELECTRIC POWER STEERING APPARATUS

(75) Inventors: Nam Hwan Heo, Chuncheon-si (KR);
Dong Sik Kim, Pohang-si (KR)

(73) Assignee: Mando Corporation, Pyeongtaek-Si,
Gyeonggi-Do (KR)

( * ) Notice: Subject to any disclaimer, the term of this patent is extended or adjusted under 35 U.S.C. 154(b) by 51 days.

(21) Appl. No.: 13/586,661

(22) Filed: Aug. 15, 2012

(65) Prior Publication Data

US 2013/0043088 A1   Feb. 21, 2013

(30) Foreign Application Priority Data

Aug. 16, 2011 (KR) .................. 10-2011-0081249

(51) Int. Cl.
B62D 5/04 (2006.01)

(52) U.S. Cl.
CPC ............... B62D 5/0424 (2013.01); B62D 5/04 (2013.01)
USPC ........................................................ 180/444

(58) Field of Classification Search
CPC ....... B62D 5/04; B62D 5/0403; B62D 5/0424
USPC ........................................................ 180/444
See application file for complete search history.

(56) References Cited

U.S. PATENT DOCUMENTS

| | | | |
|---|---|---|---|
| 7,191,866 B2 * | 3/2007 | Sasaki et al. ................. | 180/444 |
| 7,237,647 B2 * | 7/2007 | Nakamura et al. ............ | 180/444 |
| 7,278,334 B2 * | 10/2007 | Saruwatari et al. ....... | 74/388 PS |
| 7,360,624 B2 * | 4/2008 | Nagamatsu .................... | 180/444 |
| 7,413,052 B2 * | 8/2008 | Sasaki et al. .................. | 180/444 |
| 7,490,696 B2 * | 2/2009 | Saruwatari et al. ............ | 180/444 |
| 7,537,080 B2 * | 5/2009 | Murakami et al. ............ | 180/444 |
| 7,591,204 B2 * | 9/2009 | Ueno et al. ................. | 74/388 PS |
| 7,637,348 B2 * | 12/2009 | Namgung ..................... | 180/444 |
| 7,837,002 B2 * | 11/2010 | Kanda et al. .................. | 180/444 |
| 7,886,865 B2 * | 2/2011 | Sekine et al. ................. | 180/444 |
| 8,102,138 B2 * | 1/2012 | Sekine et al. ................. | 318/646 |
| 8,627,918 B2 * | 1/2014 | Sekine et al. ................. | 180/444 |
| 2005/0121251 A1 * | 6/2005 | Ueno et al. .................... | 180/444 |
| 2005/0133297 A1 * | 6/2005 | Chikaraishi ................... | 180/444 |
| 2007/0095600 A1 * | 5/2007 | Jo et al. ........................ | 180/444 |
| 2007/0187169 A1 * | 8/2007 | Sasaki et al. .................. | 180/444 |
| 2009/0107756 A1 * | 4/2009 | Miyoshi et al. ............... | 180/444 |
| 2009/0120712 A1 * | 5/2009 | Kashimoto et al. ........... | 180/444 |
| 2012/0273292 A1 * | 11/2012 | Sekine et al. ................. | 180/444 |

FOREIGN PATENT DOCUMENTS

JP    2006-027577 A    2/2006
KR   10-2007-0044731 A   4/2007

* cited by examiner

*Primary Examiner* — Kevin Hurley
*Assistant Examiner* — Michael Stabley
(74) *Attorney, Agent, or Firm* — McDermott Will & Emery LLP

(57) ABSTRACT

The present invention relates to an electric power steering apparatus. According to the present invention, it is possible to provide an electric power steering apparatus configured to be capable of being assembled in a state in which the tension of a belt is correctly tuned without using a separate process of measuring the tension of the belt, to substantially reduce the number of steps at the time of assembling a motor housing and a rack housing and hence the manufacturing costs, and to reduce vibration and noise to provide a pleasant steering feeling to a driver.

12 Claims, 9 Drawing Sheets

ELECTRIC POWER STEERING APPARATUS

CROSS-REFERENCE TO RELATED APPLICATION

This application claims priority from and the benefit under 35 U.S.C. §119(a) of Korean Patent Application No. 10-2011-0081249, filed on Aug. 16, 2011, which is hereby incorporated by reference for all purposes as if fully set forth herein.

BACKGROUND OF THE INVENTION

1. Field of the Invention

The present invention relates to an electric power steering apparatus. More particularly, the present invention relates to an electric power steering apparatus configured to be capable of being assembled in a state in which the tension of a belt is correctly tuned without using a separate process of measuring the tension of the belt, to substantially reduce the number of steps at the time of assembling a motor housing and a rack housing and hence the manufacturing costs, and to reduce vibration and noise to provide a pleasant steering feeling to a driver.

2. Description of the Prior Art

A steering apparatus means an apparatus that allows a driver to change a driving direction of the vehicle by his/her will. The steering apparatus helps the driver to optionally change the center of rotation, about which the vehicle's front wheels are turned, so as to make the vehicle move in a direction desired by the driver.

In order to steer the wheels when the vehicle is in the stopped state, it is necessary to turn the handle with a force to overcome the frictional force between the wheels and a road surface. Specifically, the driver's steering force should be further increased if the vehicle is heavy or if the wheels are wide, since the frictional force between the wheels and the road surface is increased.

In order to reduce the driver's force, a power steering system is additionally provided in such a steering apparatus. A hydraulic power steering apparatuses using hydraulic pressure of a hydraulic pump has been used as a power steering apparatus for a vehicle. However, an electric power steering apparatus using an electric motor has been gradually popularized since the 1990s.

An existing hydraulic power steering apparatus is configured such that a hydraulic pump, which is a power source for assisting power, is always driven regardless whether the steering wheel is rotated or not, thereby always consuming energy. To the contrary, an electric power steering apparatus is configured such that when the steering wheel is rotated to produce a torque, a motor driven by electric energy provides a steering-assisting power. Thus, with such an electric power steering apparatus, it is possible to enhance the energy efficiency as compared to the hydraulic power steering apparatus.

FIG. 1 is a schematic view of a conventional electric power steering apparatus for a vehicle, and FIG. 2 is a side elevational view showing a motor pulley housing and a rack housing in accordance with a prior art.

As illustrated in FIG. 1, an electric power steering apparatus for a vehicle typically includes a steering system 100 that extends from a steering wheel 101 to opposite front wheels 108, and an auxiliary power mechanism 120 that provide auxiliary steering power to the steering system 100.

The steering system 100 includes a steering shaft 102, one end of which is connected to the steering wheel 101 to be rotated together with the steering wheel 101, and the other end of which is connected to a pinion 104 via a pair of universal joints 103. In addition, the pinion shaft 104 is connected to a rack bar 109 through a rack-and-pinion mechanism 105, and each of the opposite ends of the rack bar 109 is connected to one of the vehicle's wheels 108 through a tie rod 106 and a knuckle arm 107.

The rack-and-pinion mechanism 105 is formed by a pinion gear 111 formed on the pinion shaft 104 and a rack gear 112 formed at a side of the periphery of the rack bar 109, in which the pinion gear 111 and the rack gear 112 are engaged with each other. Accordingly, when a driver operates the steering wheel 108, a torque is produced in the steering system 100, and the wheels 109 are steered by the torque transmitted through the rack-and-pinion mechanism 105 and the tie rods 106.

The auxiliary power mechanism 120 includes: a torque sensor 121 that senses the torque applied to the steering wheel 101 by the driver, and outputs an electric signal proportional to the sensed torque; an electric control unit (ECU) 123 that produces a control signal based on the electric signal transmitted from the torque sensor 121; a motor 130 that produces an auxiliary power based on the control signal transmitted from the ECU 123; and a belt-type transmission 140 that transmits the auxiliary power produced by the motor 130 to the rack bar 109 through a belt.

Therefore, the electric power steering apparatus is configured such that the torque produced by rotating the steering wheel 101 is transmitted to the rack bar 109 through the rack-and-pinion mechanism 105, and the auxiliary power produced by the motor 130 based on the produced torque is transmitted to the rack bar 109 via a ball screw unit 150 by the belt-type transmission 140. That is, the torque produced by the steering system 100 and the auxiliary power produced by the motor 130 are summed to make the rack bar 109 move axially.

In addition, as illustrated in FIG. 2, the motor 130 is fastened by joining the motor housing 235 enclosing the motor 130 and a rack housing 207 by bolts 230. At the time of steering, the motor spindle 203 is rotated which in turn drives belt 209 to rotate a ball nut 205. Upon being rotated by the belt 209, the ball nut 205 makes the rack bar 109 reciprocate.

The conventional electric power steering apparatus as described above has a problem in that since it is necessary to measure the tension of the belt when assembling the motor housing and the rack housing, and to tune the tension of the belt, the assembling process is delayed and the manufacturing costs are increased.

In addition, if the electric power steering apparatus were assembled without correctly measuring the belt tension, the electric power steering apparatus may be overloaded, noises may occur between the belt and a driving pulley or a driven pulley, and the belt may be damaged, due to the high or low tension of the belt.

SUMMARY OF THE INVENTION

Accordingly, the present invention has been made to solve the above-mentioned problems occurring in the prior art, and an aspect of the present invention is to provide an electric power steering apparatus configured to be capable of being assembled in a state in which the tension of a belt is correctly tuned without using a separate process of measuring the tension of the belt, to substantially reduce the number of steps at the time of assembling a motor housing and a rack housing and hence the manufacturing costs, and to reduce vibration and noise to provide a pleasant steering feeling to a driver In accordance with an aspect of the present invention, there is provided an electric power steering apparatus configured to transmit a driving force of a motor to a rack bar via a belt, the electric power steering apparatus including: a motor housing that is provided with a housing end formed eccentric to the spindle of the motor, and a fastening flange on the periphery of the housing end; a rack housing that is provided with an insertion hole, into which the housing end is inserted, and a fastening flange on the outer periphery of an end face of the rack housing; and position confirmation means that are formed on the motor housing and the rack housing at a position where the tension of belt is set when the motor housing and the rack housing are assembled to each other.

According to the present invention, it is possible to provide an electric power steering apparatus configured to be capable of being assembled in a state in which the tension of a belt is correctly tuned without using a separate process of measuring the tension of the belt, to substantially reduce the number of steps at the time of assembling a motor housing and a rack housing and hence the manufacturing costs, and to reduce vibration and noise to provide a pleasant steering feeling to a driver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
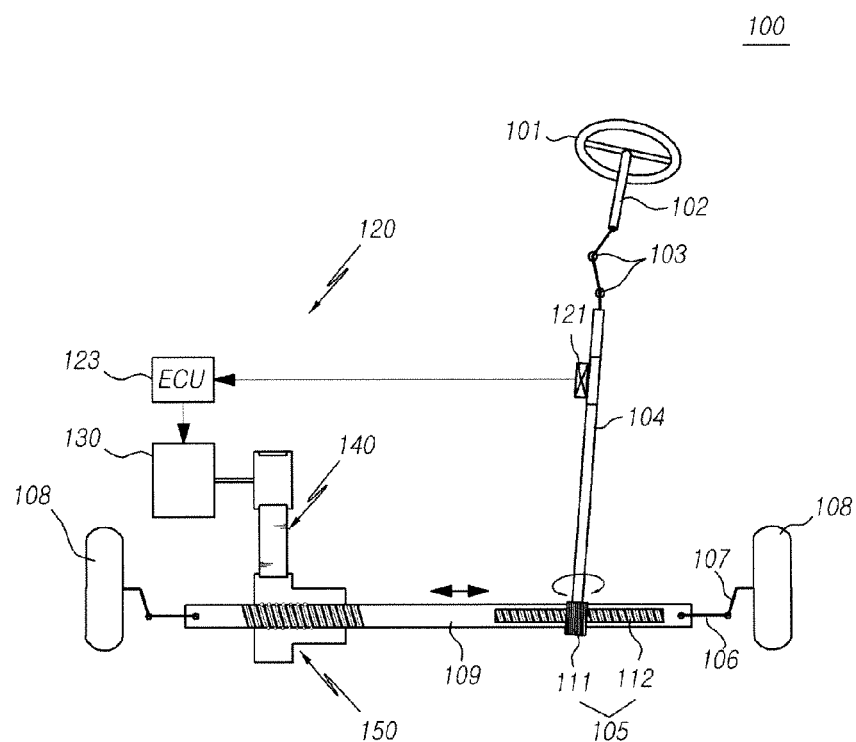
FIG. 1 is a schematic view of a conventional electric power steering apparatus for a vehicle.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
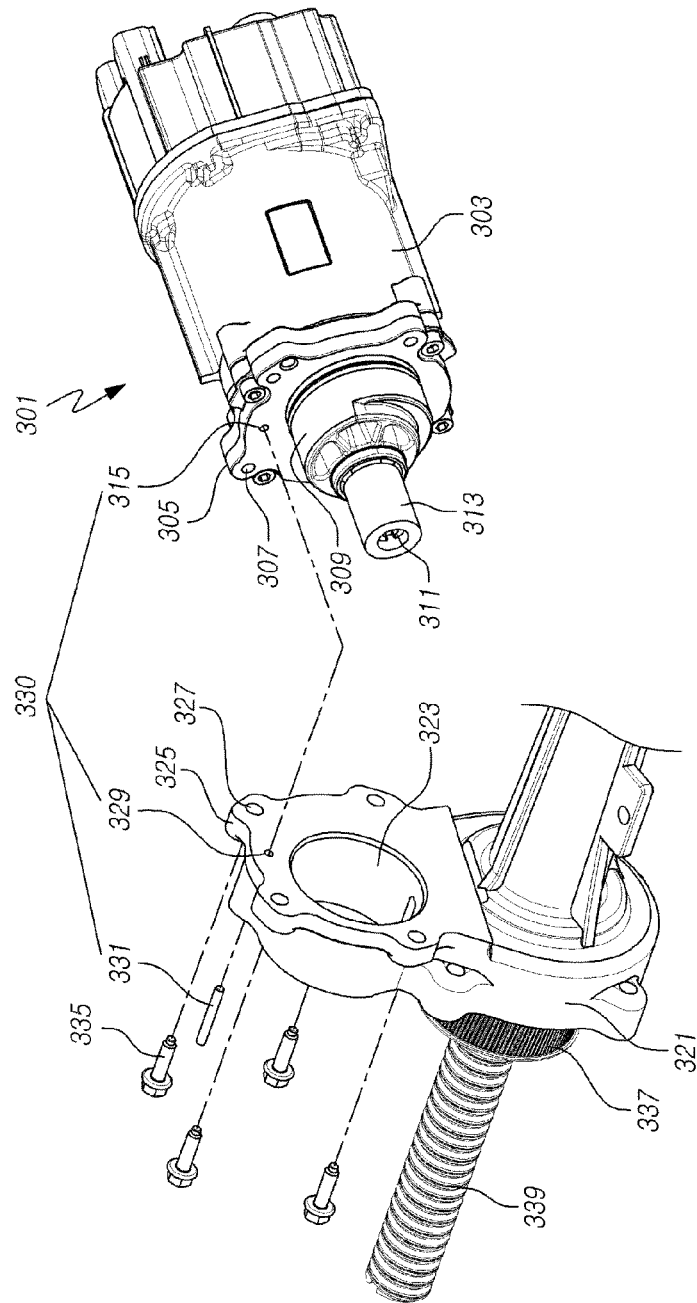
FIG. 3 is an exploded perspective view illustrating an electric power steering apparatus for a vehicle in accordance with an embodiment of the present invention.

FIG. 3 is an exploded perspective view illustrating an electric power steering apparatus for a vehicle in accordance with an embodiment of the present invention. FIGS. 4 to 8 are an exploded perspective views illustrating various exemplary embodiments of the inventive electric power steering apparatus. FIG. 9 is a perspective view illustrating, by way of an example, the inventive electric power steering apparatus.

Figure 2:
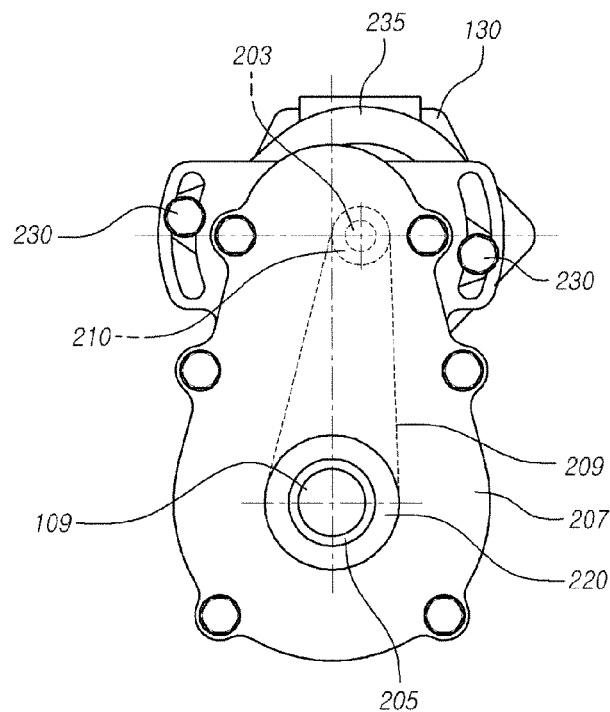
FIG. 2 is a side elevational view illustrating a motor pulley housing and a rack housing in accordance with a prior art.

Referring to these drawings together with FIGS. 1 and 2, the inventive electric power steering apparatus is configured to transmit a driving force of a motor 301 to a rack bar 339 through a belt 341, and includes: a motor housing 303 that is provided with a housing end 309 formed eccentric to a motor spindle 311, and a fastening flange 305 extending from the outer periphery of the housing end 309; a rack housing 321 that is provided with an insertion hole 323, into which the housing end 309 is inserted, and a mounting flange 325 configured to be coupled with the fastening flange 305, the mounting flange 325 being formed at an end of the rack housing 321; and position confirmation means 330 which are formed on the motor housing 303 and the rack housing 321 at a position where the tension of the belt 341 is set when the position confirmation means 330 are coupled to each other.

The electric power steering apparatus includes a driving means and a driven means, in which the driving means includes a motor 301 controlled by an ECU, a driving pulley 313 joined to the spindle of the motor 301, and a belt 341.

In addition, the driven means includes a ball nut that supports the rack bar 339 in the inside of the rack housing 321 enclosing a rack bar 339, and a driven pulley 337 that is separately molded on or joined to the outer periphery of the ball nut.

The driving pulley 313 connected to the motor 301, and the driven pulley 337 connected to the rack bar 339 are arranged in parallel, and the belt 341 is put on the driving pulley 313 and the driven pulley 337 to transmit the rotational force of the motor 301 to the rack bar 339 through the ball nut. The rack bar 339 is configured to be moved left and right by the operation of the ball nut, thereby producing the steering assisting force.

The ball nut is coupled with the rack bar 339 via a ball such that the ball nut slides the rack bar 339 in the inside of the rack housing 321 while being rotated, and the driven pulley 337 mounted on the outer periphery to rotate the ball nut. Thus, the steering assisting force can be generated by sliding the rack bar 339 axially.

The driven pulley 337 rotating the ball nut in this manner is configured to be rotated in cooperation with the driving pulley 313 via the belt 341. If the tension of the belt 341 is correctly tuned at the time of assembly, slipping may occur between the belt and the pulleys when the tension is low, or the belt 341 may be degraded in terms of endurance or may be poor in power transmission capability by being overloaded when the tension is high.

Therefore, the rack housing 321 and the motor housing 303 have been conventionally assembled at a position which corresponds to a tension value set by measuring the tension of the belt 341 when assembling the rack housing 321 and the motor housing 303. However, according to the present invention, merely by assembling the rack housing 321 and the motor housing 303 through the position confirmation means 330 provided on the rack housing 321 and the motor housing 303 without separately performing a belt tension measuring process, it is possible to assemble the rack housing 321 and the motor housing 303 such that the tension of the belt 341 can arrive at the set value and remain in the set value for a long time.

As illustrated in FIG. 3, the position confirmation means 330 may be constituted with through-holes 315 and 329 formed through the fastening flange 305 and the mounting flange 325, and a fixing member 331 fitted in the through-holes 315 and 329.

That is, when assembling the motor housing 303 and the rack housing 321, the housing end 309 of the motor housing 303 is inserted into the insertion hole 323 of the rack housing 321, the belt 341 is connected to the driving pulley 313 joined to the terminal end of the motor angle 311, and then the motor housing 303 and the rack housing 321 are assembled through the position confirmation means 330 at a position where the tension of the belt 341 is set.

The centers of the through-holes 315 and 329 provided in the fastening flanges 305 and the mounting flanges 325 are adapted to coincide with each other at a position where the tension of the belt 341 arrives at the set value as described above. In this condition, the fixing member 331 is fitted in the through-holes 315 and 329, and then the motor housing 303 and the rack housing 321 are joined by fastening members 335.

Therefore, it is possible to remove the cumbersomeness caused by measuring the tension of the belt 341 time after time and then assembling the motor housing 303 and the rack housing 321.

Here, the fastening holes 307 formed in the fastening flange 305 and the mounting holes 327 formed in the mounting flange 325 are formed in different sizes. The fastening holes 307 are formed as screw holes to be screw-coupled with the fastening members 335, and the mounting holes 327 are formed larger than the fastening holes 307 such that a minute change of the tension setting position of the belt 341 can be accommodated by the rotation of the motor housing 303.

Figure 4:
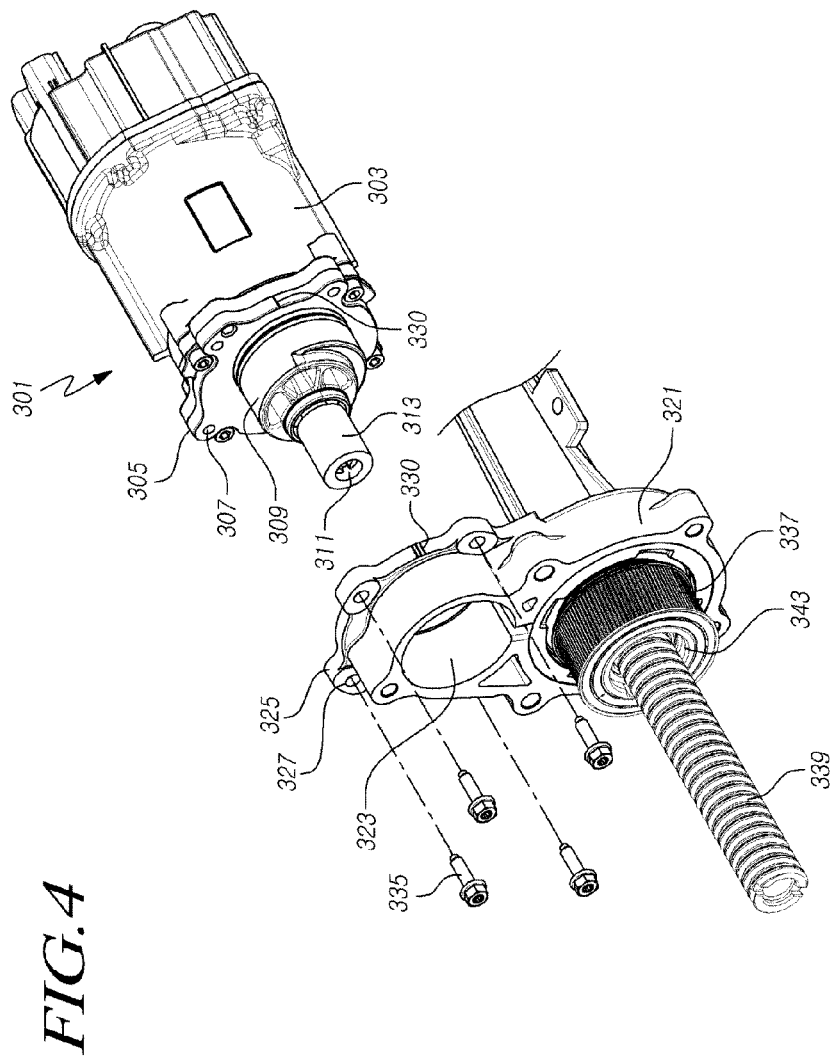
FIGS. 4 to 8 are an exploded perspective views illustrating various exemplary embodiments of the inventive electric power steering apparatus.

In addition, as illustrated in FIG. 4, the position confirmation means 330 may be formed to be indicated by relief or sunk relief on the outer peripheries of the fastening flange 305 and the mounting flange 325.

That is, the assembly may be conducted as follows: by rotating the housing end 309 of the motor housing 303 in the insertion hole 323, the motor housing 303 is rotated to a position where the linear position confirmation means 330 indicated by sunk relief or relief on the fastening flange 305 and the mounting flange 325 are axially arranged with each other, and the motor housing 303 and the rack housing 321 are assembled to each other by the fastening members 335.

Therefore, what is needed to be done by a worker when assembling the motor housing 303 and the rack housing 321 is only to assemble the motor housing 303 and the rack housing 321 at the position where the position confirmation means 330 indicated on the outer peripheries of the fastening flange 305 and the mounting flange 325 are arranged with each other.

In addition, it is possible to form the position confirmation means 330 indicated by sunk relief or relief in such a manner than the position confirmation means formed on one of the fastening flange 305 and the mounting flange 325 have a width lager than that formed on the other of the fastening flange 305 and the mounting flange 325, or to form a plurality of position confirmation means 330 on one of the fastening flange 305 and the mounting flange 325. As such, the positioning means 305 may indicate a margin of assembling error of the motor housing 303, i.e. the allowable range of the set value of the belt tension at the time of assembling the motor housing 303 and the rack housing 321.

Figure 5:
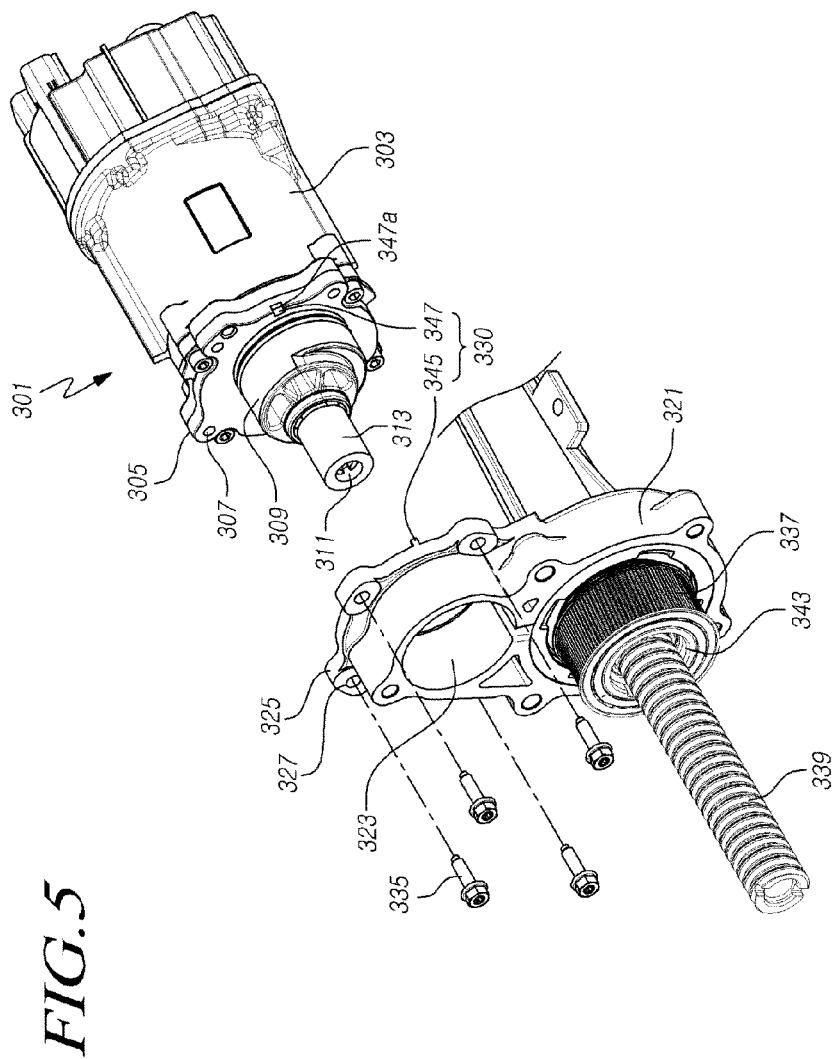

In addition, as illustrated in FIG. 5, the position confirmation means 330 may be constituted with a protrusion 345 formed on one of the fastening flange 305 and the mounting flange 325, and a recess 347 formed on the other of the fastening flange 305 and the mounting flange 325 such that the protrusion 305 can be inserted into the recess 347, in which case, the recess 347 is formed to be elongated along the circumference on an end face of one of the fastening flange 305 and the mounting flange 325, and is provided with stepped portions 347a at the circumferential opposite ends to support the protrusion 345 when the motor housing 303 is rotated FIG. 5 illustrates that the protrusion 345 is formed on the rack housing 321 and the recess 347 is formed on the motor housing 303, in which case the recess 347 is formed on the outer periphery of the end of the fastening flange 305, and the protrusion 345 is formed to protrude from the end face of the mounting flange 325 to be inserted into the recess 347.

Therefore, when assembling the motor housing 303 and the rack housing 321, the housing end 309 of the motor housing 303 is rotated in the insertion hole 323 to rotate the protrusion 345 to one of the stepped portions 347a of the recess 347, and then the motor housing 303 and the rack housing 321 are joined by the fastening members 335.

Figure 6:
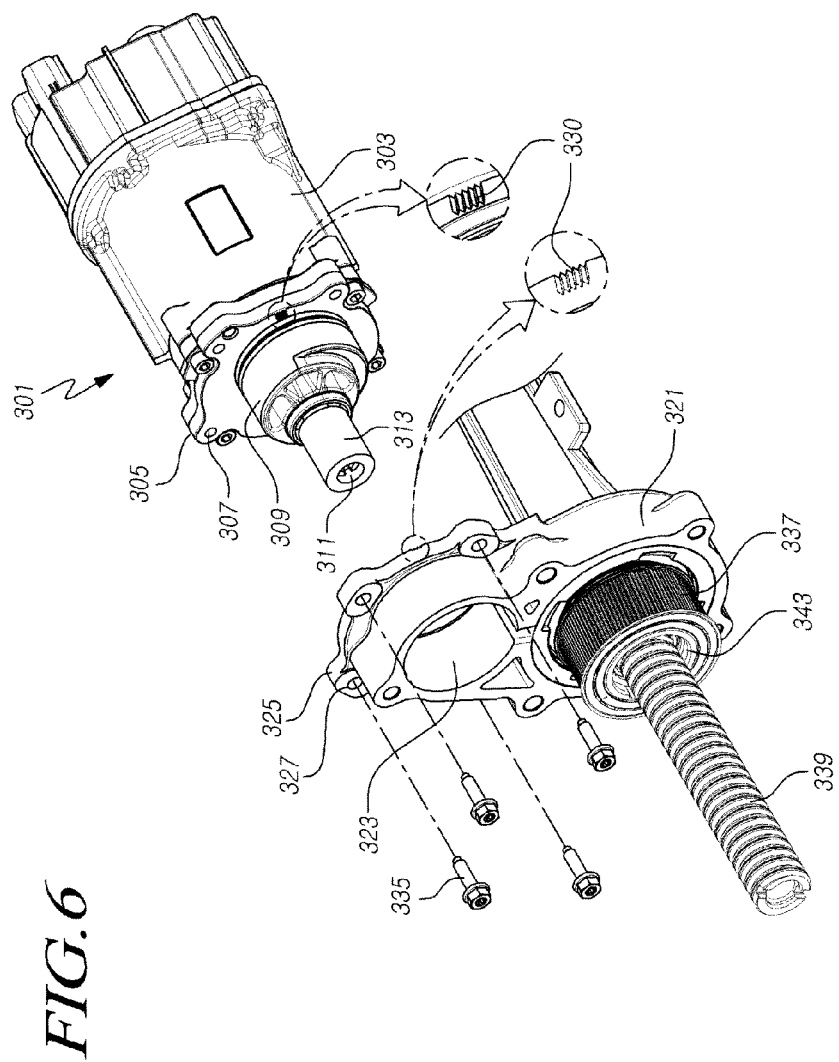

In addition, as illustrated in FIG. 6, the position confirmation means 330 may be formed in tooth shapes on the peripheries of the fastening flange 305 and the mounting flange 325 to be engaged with each other.

That is, the position confirmation means 330 may be machined in tooth shapes on the outer peripheries of the fastening flange 305 and the mounting flange 325, or formed by molding the tooth shapes with a resin integrally with the outer peripheries of the fastening flanges 305 and the mounting flanges 325 such that the fastening flange 305 and the mounting flange 325 can be assembled at the position where the position confirmation means 330 are engaged with each other.

Figure 7:
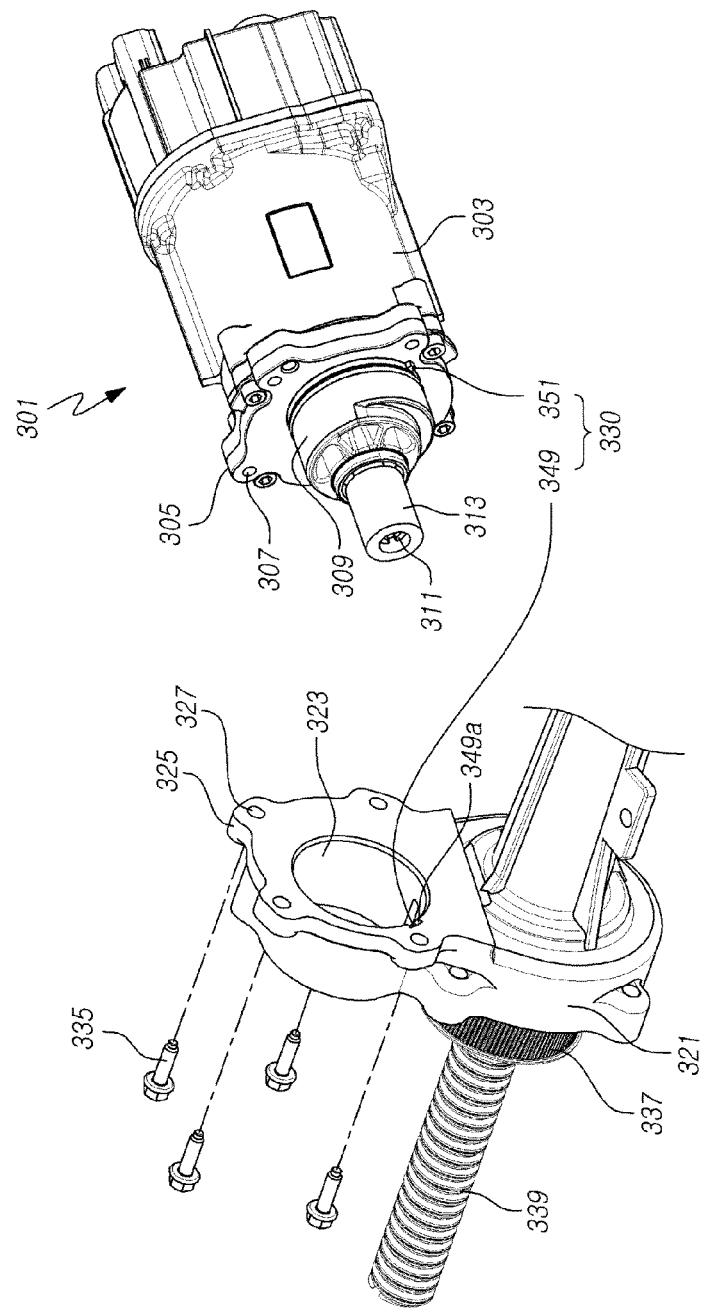

In addition, as illustrated in FIG. 7, the position confirmation means 330 may be constituted with a recess 349 formed on the inner periphery of the insertion hole 323 of the rack housing 321, and a protrusion 351 formed on the outer periphery of the housing end 309 of the motor housing 303, in which case the recess 349 is formed to be elongated along the circumference of the end of the recess 349, and is provided with a stepped portion 349a at each of the circumferentially opposite ends thereof to support and fix the protrusion 351 when the motor housing 303 is rotated.

That is, the circumferential recess 349 is formed at the end of the inner periphery of the insertion hole 323 of the rack housing 321, and the protrusion 351 is formed on the outer periphery of the housing end 309 of the motor housing 303 which corresponds in position to the end of the inner periphery of the insertion hole 323 such that the motor housing 303 and the rack housing 321 can be assembled as follows: the housing end 309 of the motor housing 303 is inserted into the insertion hole 323 and rotated to rotate the protrusion 351 to one of the stepped portions 349a of the recess 349, and the motor housing 303 and the rack housing 321 are joined to each other with the fastening members 335.

Figure 8:
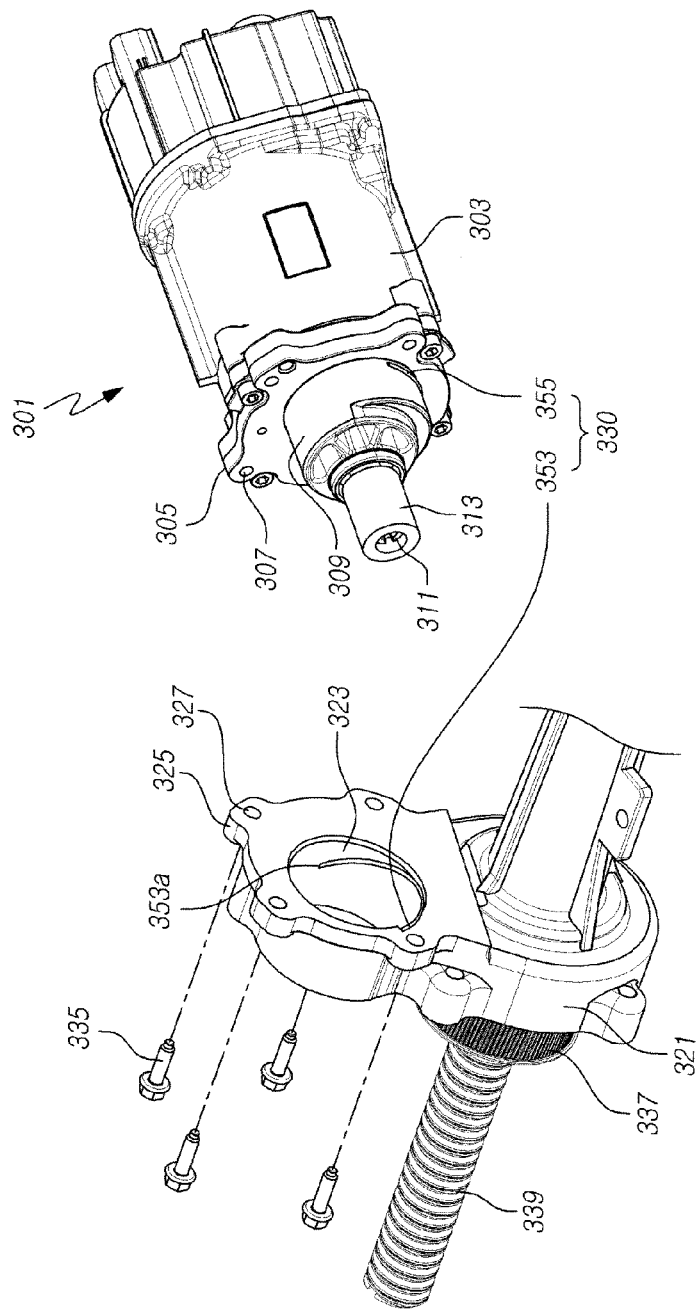
Figure 9:
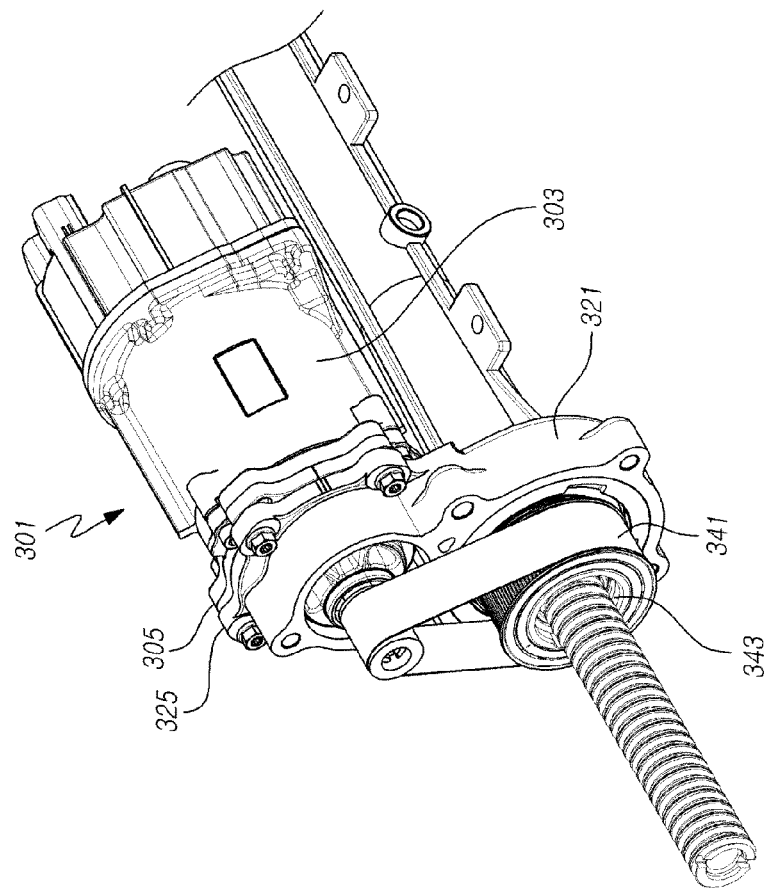
FIG. 9 is a perspective view illustrating, by way of an example, the inventive electric power steering apparatus.

In addition, as illustrated in FIG. 8, the recess 353 formed in the insertion hole 323 may be formed in a spiral shape to be screw-coupled when the rack housing 321 and the motor housing 303 are assembled.

Furthermore, the protrusion 355 formed on the housing end 309 may be formed as a protrusion with a short length and narrow width to be slid along the recess 353, or may be formed in a spiral shape as illustrated in FIG. 7, to be screw-coupled when the rack housing 321 and the motor housing 303 are assembled.

In this case, when assembling the motor housing 303 and the rack housing 321, it is enough merely to rotating the motor housing 303 as if fastening a screw. Thus, the tension setting position of the belt 341 can be confirmed more easily when the motor housing 303 and the rack housing 321 are assembled.

As described above, according to the present invention, it is possible to provide an electric power steering apparatus configured to be capable of being assembled in a state in which the tension of a belt is correctly tuned without using a separate process of measuring the tension of the belt, to substantially reduce the number of steps at the time of assembling a motor housing and a rack housing and hence the manufacturing costs, and to reduce vibration and noise to provide a pleasant steering feeling to a driver.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An electric power steering apparatus configured to transmit a driving force of a motor to a rack bar via a belt, the electric power steering apparatus comprising:
    a motor housing including a housing end formed eccentric to a spindle of the motor, and a fastening flange on the periphery of the housing end;
    a rack housing including an insertion hole, into which the housing end is inserted, and a mounting flange on the outer periphery of an end face of the rack housing; and
    a position confirmation means formed on the fastening flange and the mounting flange, wherein:
    the fastening flange has a shape corresponding to a shape of the mounting flange, and
    the position confirmation means includes:
    a first sunk relief or relief formed on an outer periphery surface of the fastening flange; and
    a second sunk relief or relief formed on an outer periphery surface of the mounting flange.

2. The electric power steering apparatus as claimed in claim 1, wherein the position confirmation means comprise through-holes formed through the fastening flange and the mounting flange, and a fixing member fitted in the through holes.

3. The electric power steering apparatus as claimed in claim 1, wherein the position confirmation means comprise a protrusion formed on one of the fastening flange and the mounting flange, and a recess formed on the other of the fastening flange and the mounting flange such that the protrusion can be inserted into the recess.

4. The electric power steering apparatus as claimed in claim 3, wherein the recess is formed to be elongated along the circumference of an end face of one of the fastening flange and the mounting flange, and is provided with a stepped portion at each end thereof to support the protrusion when the motor housing is rotated.

5. The electric power steering apparatus as claimed in claim 1, wherein the position confirmation means are formed in tooth shapes on the outer peripheries of the fastening flange and the mounting flange to be engaged with each other.

6. The electric power steering apparatus as claimed in claim 5, wherein the position confirmation means are formed by machining the outer peripheries of the fastening flange and the mounting flange or integrally molding a resin on the outer peripheries of the fastening flange and the mounting flange in the tooth shapes.

7. The electric power steering apparatus as claimed in claim 1, wherein the position confirmation means comprise a recess formed on the inner periphery of the insertion hole of the rack housing, and a protrusion formed on the outer periphery of the housing end of the motor housing.

8. The electric power steering apparatus as claimed in claim 7, wherein the recess is formed along the circumference of the end of the inner periphery of the insertion hole, and is formed with a stepped portion to support the protrusion when the motor housing is rotated.

9. The electric power steering apparatus as claimed in claim 7, wherein the recess and the protrusion are formed in a spiral shape to be screw-coupled to each other when the rack housing and the motor housing are assembled.

10. The electric power steering apparatus as claimed in claim 1, wherein one of the first sunk relief or relief and the second sunk relief or relief is wider than the other of the first sunk relief or relief and the second sunk relief or relief.

11. An electric power steering apparatus configured to transmit a driving force of a motor to a rack bar via a belt, the electric power steering apparatus comprising:
    a motor housing that is provided with a housing end formed eccentric to the spindle of the motor, and a fastening flange on the periphery of the housing end;
    a rack housing that is provided with an insertion hole, into which the housing end is inserted, and a mounting flange on the outer periphery of an end face of the rack housing; and
    position confirmation means that are formed on the motor housing and the rack housing at a position where the tension of belt is set when the motor housing and the rack housing are assembled to each other,
    wherein the position confirmation means is indicated with a sunk relief or relief on the outer peripheries of the fastening flange and the mounting flange.

12. The electric power steering apparatus as claimed in claim 11, wherein the position confirmation means on one of the fastening flange and the mounting flange are formed to be wider than that formed on the other of the fastening flange and the mounting flange.

* * * * *